(12) United States Patent
Barthel et al.

(10) Patent No.: US 9,669,612 B2
(45) Date of Patent: Jun. 6, 2017

(54) LAMINATING MATERIAL AND METHOD OF MANUFACTURING

(75) Inventors: Michael Barthel, Chicago, IL (US); Samuel P. Amdahl, Prospect Heights, IL (US); Gideon Schlessinger, Deerfield, IL (US)

(73) Assignee: ACCO Brands Corporation, Lake Zurich, IL (US)

( * ) Notice: Subject to any disclaimer, the term of this patent is extended or adjusted under 35 U.S.C. 154(b) by 744 days.

(21) Appl. No.: 12/880,578

(22) Filed: Sep. 13, 2010

(65) Prior Publication Data

US 2011/0064337 A1    Mar. 17, 2011

Related U.S. Application Data

(60) Provisional application No. 61/242,114, filed on Sep. 14, 2009.

(51) Int. Cl.
| | |
|---|---|
| *B32B 7/12* | (2006.01) |
| *B32B 38/18* | (2006.01) |
| *B32B 37/12* | (2006.01) |
| *B32B 37/18* | (2006.01) |
| *B32B 37/14* | (2006.01) |

(52) U.S. Cl.
CPC ...... *B32B 38/1833* (2013.01); *B32B 37/1284* (2013.01); *B32B 37/185* (2013.01); *B32B 37/142* (2013.01); *B32B 2307/41* (2013.01); *B32B 2307/412* (2013.01); *B32B 2307/414* (2013.01); *Y10T 428/24364* (2015.01);
(Continued)

(58) Field of Classification Search
CPC ............ B32B 37/1284; B32B 38/1833; B32B 37/142; B32B 2307/414
See application file for complete search history.

(56) References Cited

U.S. PATENT DOCUMENTS 282,920 A * 8/1883 Plimpton ............... B65D 27/16
156/291
2,411,368 A * 11/1946 Dow .......................... 206/103
(Continued)

FOREIGN PATENT DOCUMENTS

| | | |
|---|---|---|
| BE | 1015675 A3 | 7/2005 |
| DE | 20100328 | 3/2001 |

(Continued)

OTHER PUBLICATIONS

Definitions of term "texture", "indicia", and "translucent" from The Free Merriam-Webster Dictionary, retrived on May 12, 2013.*
(Continued)

*Primary Examiner* — Anish Desai
(74) *Attorney, Agent, or Firm* — Michael Best & Friedrich, LLP

(57) ABSTRACT

A laminating sheet includes a translucent ply and an adhesive coating applied to the translucent ply. The adhesive coating is activatable by at least one of pressure and heat and is provided on the translucent ply in a configuration providing at least one form of indicia that is visible prior to the adhesive being activated. A method of manufacturing a laminating sheet is also disclosed, whereby an adhesive coating activatable by at least one of pressure and heat is applied to a translucent ply and is configured to provide at least one form of visible indicia.

21 Claims, 6 Drawing Sheets

(52) U.S. Cl.
CPC ............... *Y10T 428/24612* (2015.01); *Y10T 428/24802* (2015.01); *Y10T 428/24843* (2015.01)

(56) References Cited

U.S. PATENT DOCUMENTS

| | | | | |
|---|---|---|---|---|
| 2,850,395 | A * | 9/1958 | Green | B41M 1/36 |
| | | | | 106/150.2 |
| 3,379,560 | A * | 4/1968 | Tharp | 428/174 |
| 3,961,112 | A * | 6/1976 | Genevitz et al. | 428/29 |
| 4,068,028 | A * | 1/1978 | Samonides | C09J 7/0296 |
| | | | | 156/277 |
| 4,188,139 | A * | 2/1980 | Pasini et al. | 400/696 |
| 4,564,406 | A * | 1/1986 | Binks | B44C 1/1733 |
| | | | | 156/235 |
| 4,771,891 | A * | 9/1988 | Sorensen | B65D 5/708 |
| | | | | 156/291 |
| 4,795,513 | A | 1/1989 | Jensen, Jr. | |
| 5,042,843 | A * | 8/1991 | Kuhns et al. | 283/109 |
| 5,100,181 | A * | 3/1992 | Nathans et al. | 283/109 |
| 5,209,374 | A | 5/1993 | Seidl-Lichthardt | |
| 5,219,625 | A * | 6/1993 | Matsunami et al. | 428/30 |
| 5,439,539 | A | 8/1995 | McLean | |
| 5,447,333 | A * | 9/1995 | Kuhns et al. | 281/29 |
| 5,498,305 | A | 3/1996 | Mailloux | |
| 5,650,215 | A * | 7/1997 | Mazurek | B29C 43/222 |
| | | | | 428/156 |
| 5,660,660 | A | 8/1997 | Greuel, Jr. et al. | |
| 5,670,015 | A | 9/1997 | Finestone et al. | |
| 5,727,684 | A | 3/1998 | Webb et al. | |
| 5,730,736 | A | 3/1998 | Sawers et al. | |
| 5,811,116 | A | 9/1998 | Gilman et al. | |
| 5,858,510 | A * | 1/1999 | Dressler | 428/167 |
| 5,890,774 | A * | 4/1999 | Schwartz et al. | 281/31 |
| 6,015,600 | A | 1/2000 | Greuel, Jr. et al. | |
| 6,197,397 | B1 * | 3/2001 | Sher et al. | 428/42.3 |
| 6,199,979 | B1 * | 3/2001 | Hobson | B01D 39/1661 |
| | | | | 210/500.1 |
| 6,294,033 | B1 | 9/2001 | Fukuoka et al. | |
| 6,865,765 | B2 * | 3/2005 | Aalbers | A47L 25/005 |
| | | | | 15/104.002 |
| 6,887,541 | B2 | 5/2005 | Benim et al. | |
| 6,974,609 | B2 * | 12/2005 | Engle et al. | 428/32.2 |
| 6,991,130 | B2 | 1/2006 | Presutti et al. | |
| 7,081,286 | B2 | 7/2006 | Benim et al. | |
| 7,128,236 | B2 | 10/2006 | Presutti et al. | |
| 7,267,857 | B1 | 9/2007 | Singer | |
| 7,276,278 | B2 * | 10/2007 | Kamiyama | B41M 7/0027 |
| | | | | 428/167 |
| 7,766,064 | B2 | 8/2010 | Pan | |
| 7,906,189 | B2 * | 3/2011 | Tsai | B32B 27/00 |
| | | | | 428/32.6 |
| 7,987,989 | B2 | 8/2011 | Abell | |
| 8,292,162 | B2 * | 10/2012 | Heyman | B65D 27/14 |
| | | | | 229/80 |
| 2001/0039998 | A1 | 11/2001 | Senges | |
| 2003/0082326 | A1 * | 5/2003 | Yang | B32B 17/10018 |
| | | | | 428/40.1 |
| 2003/0129335 | A1 | 7/2003 | Benim et al. | |
| 2003/0215593 | A1 * | 11/2003 | Morgan | A23G 9/283 |
| | | | | 428/40.1 |
| 2003/0232168 | A1 * | 12/2003 | Fearn | G09F 3/02 |
| | | | | 428/42.3 |
| 2004/0209075 | A1 * | 10/2004 | Maloney | 428/343 |
| 2004/0241385 | A1 * | 12/2004 | Huseman | 428/99 |
| 2005/0147919 | A1 * | 7/2005 | Kunz | B05D 3/067 |
| | | | | 430/311 |
| 2005/0258634 | A1 * | 11/2005 | Dronzek, Jr. | 283/72 |
| 2006/0153736 | A1 | 7/2006 | Kalra et al. | |
| 2006/0213621 | A1 | 9/2006 | Loibl | |
| 2006/0254720 | A1 | 11/2006 | Loibl | |
| 2006/0272976 | A1 | 12/2006 | Pinney et al. | |
| 2007/0200002 | A1 * | 8/2007 | Raksha et al. | 235/491 |
| 2007/0218263 | A1 | 9/2007 | Huang et al. | |
| 2008/0199660 | A1 * | 8/2008 | Gelli | B31F 1/07 |
| | | | | 428/172 |
| 2009/0314424 | A1 | 12/2009 | Herring et al. | |
| 2010/0059184 | A1 | 3/2010 | Pan | |
| 2011/0045220 | A1 | 2/2011 | Rush | |
| 2011/0064337 | A1 * | 3/2011 | Barthel et al. | 383/116 |
| 2011/0143097 | A1 | 6/2011 | Loibl | |

FOREIGN PATENT DOCUMENTS

| | | | |
|---|---|---|---|
| DE | 10004486 | | 8/2001 |
| DE | 202009000903 | | 2/2010 |
| DE | 202009000903 | U1 | 2/2010 |
| DE | 102008057006 | | 5/2010 |
| DE | 102008057006 | A1 | 5/2010 |
| EP | 1724111 | | 11/2006 |
| EP | 2127868 | | 12/2009 |
| EP | 2210738 | | 7/2010 |
| GB | 1511060 | A | 5/1978 |
| GB | 2348703 | A * | 10/2000 ............. G01K 11/18 |
| GB | 2437941 | A | 11/2007 |
| JP | 2007130810 | | 5/2007 |
| WO | 03042312 | A1 | 5/2003 |
| WO | 2007027619 | | 3/2007 |
| WO | 2008/027816 | A1 | 3/2008 |

OTHER PUBLICATIONS

Definition of term "laminating" (laminate) from Free Online Dictionary, retrived on Dec. 11, 2013.*
Definition of "text" from Dictionary.com, Apr. 22, 2015.*
Partial manual translation of German Office Action dated May 7, 2009 for DE102008057006 A1, 2 pages.
Partial manual translation of German Office Action Response and Amendment dated Oct. 15, 2009 for DE102008057006 A1, 8 pages.
"Heat/Friction Disappearing Ink" webpages, from http://www.inventables.com/technologies/heat-friction-disappearing-ink, printed Aug. 31, 2010, publication date unknown, 7 pages.
International Search Report and Written Opinion for corresponding International Application No. PCT/US10/48606 mailed on Nov. 16, 2010.
Invitation to Pay Additional Fees and, Where Applicable, Protest Fee in PCT/US2012/061362, dated Feb. 13, 2013, 7 pages.
Australian Office Action for Patent Appl. No. 2010292037 dated Jan. 9, 2013, 3 pages.
Chinese Office Action for Patent Appl. No. 201080040899.X dated Nov. 14, 2013, 29 pages.

* cited by examiner

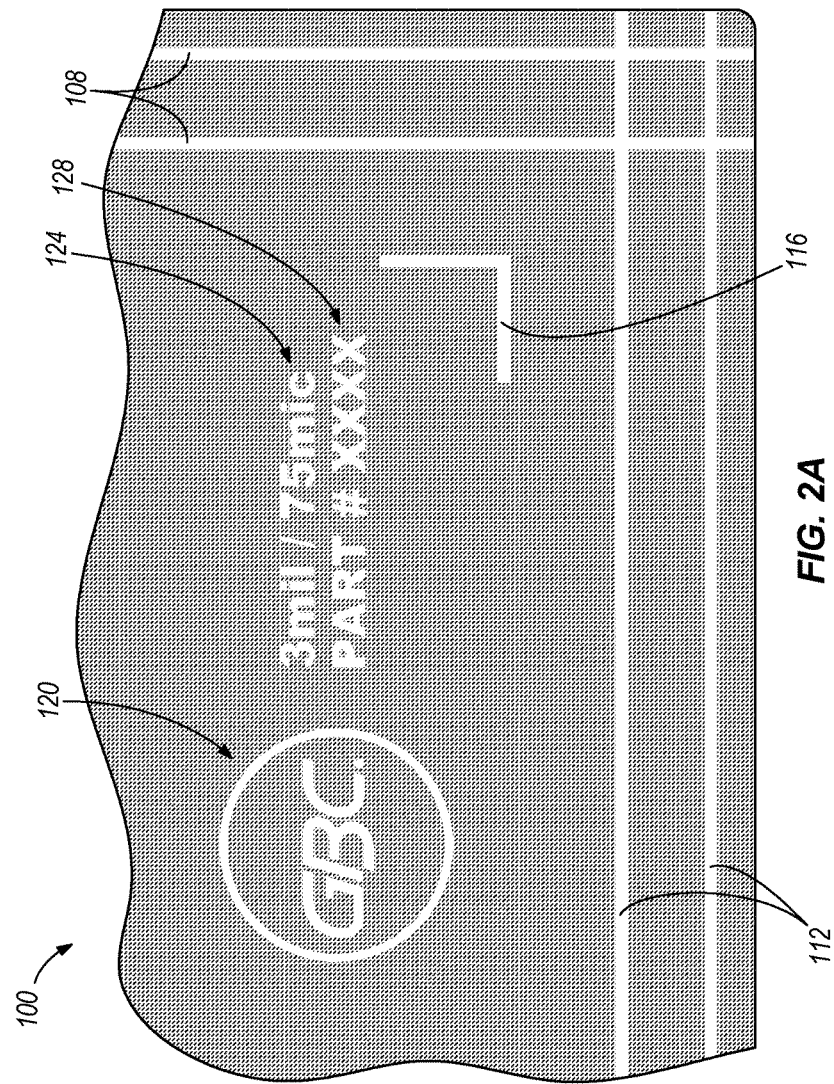

LAMINATING MATERIAL AND METHOD OF MANUFACTURING

CROSS-REFERENCE TO RELATED APPLICATIONS

This application claims priority to U.S. Provisional Patent Application No. 61/242,114, filed Sep. 14, 2009, the entire contents of which are hereby incorporated by reference.

BACKGROUND

The present invention relates to laminating material, for example translucent sheets or two-ply jackets with heat-activated adhesive for laminating sheet-type objects, such as paper, photos, etc. FIG. 1 illustrates a conventional two-ply laminating jacket 10 with heat-activated adhesive on the interior side of each ply. Before being inserted into a laminating machine to laminate a sheet-type object 14, the adhesive gives each ply of the laminating jacket 10 a slightly cloudy, partially opaque appearance although the base substrate is a substantially transparent or translucent sheet material. When heated in the laminating machine, the adhesive cures to a substantially transparent appearance so that the sheet-type object 14 is clearly visible while being securely laminated between the two plies of the jacket 10.

Laminating material is produced in a variety of configurations having different sizes, shapes, thicknesses, types of adhesive, etc. The specifications of the laminating material, including all of the relevant information that a user may need to select the desired laminating material and/or configure a laminating machine for proper operation with a particular laminating material, are generally located with or on the packaging in which the manufacturer supplies the laminating material. This may complicate the laminating task for a user if the laminating material becomes separated from the original packaging.

SUMMARY

In one aspect, the invention provides a laminating sheet including a translucent ply and an adhesive coating applied to the translucent ply. The adhesive coating is activatable by at least one of pressure and heat and is provided on the translucent ply in a configuration providing at least one form of indicia that is visible prior to the adhesive being activated.

In another aspect, the invention provides a method of manufacturing a laminating sheet. A translucent ply is provided, and an adhesive coating, activatable by at least one of pressure and heat, is applied to the translucent ply and is configured to provide at least one form of visible indicia.

BRIEF DESCRIPTION OF THE DRAWINGS

FIG. 2A is a detail view of the bottom right corner of the laminating material of FIG. 2;

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

A two-ply laminating jacket 100 is illustrated in FIGS. 2A and 2B. The laminating jacket 100 includes two plies or sheets of laminating material that are bonded together along a single edge 104, which is the top edge in the illustrated construction. Although shown as a top-sealed two-ply laminating jacket 100, it should be understood that many aspects of the invention described herein can be incorporated into laminating materials of virtually any form, such as a continuous roll, loose sheets, two-ply jackets of alternate construction (e.g. pouches having 2 or more sealed edges), etc. for use in laminating a sheet-type object.

As with conventional laminating materials, the two-ply laminating jacket 100 is used to laminate a sheet-type object by placing the object between the two plies of the jacket 100 and then putting the jacket 100 with the object through a laminating machine (not shown) to activate adhesive applied as a coating on the interior sides of the plies of the laminating jacket 100. The adhesive is activated by one or more of pressure and heat to adhere and eventually cure, thereby securing the object within the jacket 100 to form a laminated product. When activated, the adhesive flows in a liquid or semi-liquid state. The laminating process causes the adhesive to transition from a cloudy, partially opaque appearance to a substantially transparent appearance. As described in further detail below, the adhesive coating of one or more of the plies of the laminating jacket 100 is configured to provide various forms of indicia. The indicia are visible before the adhesive is activated and disappear after the adhesive is activated.

Figure 1:
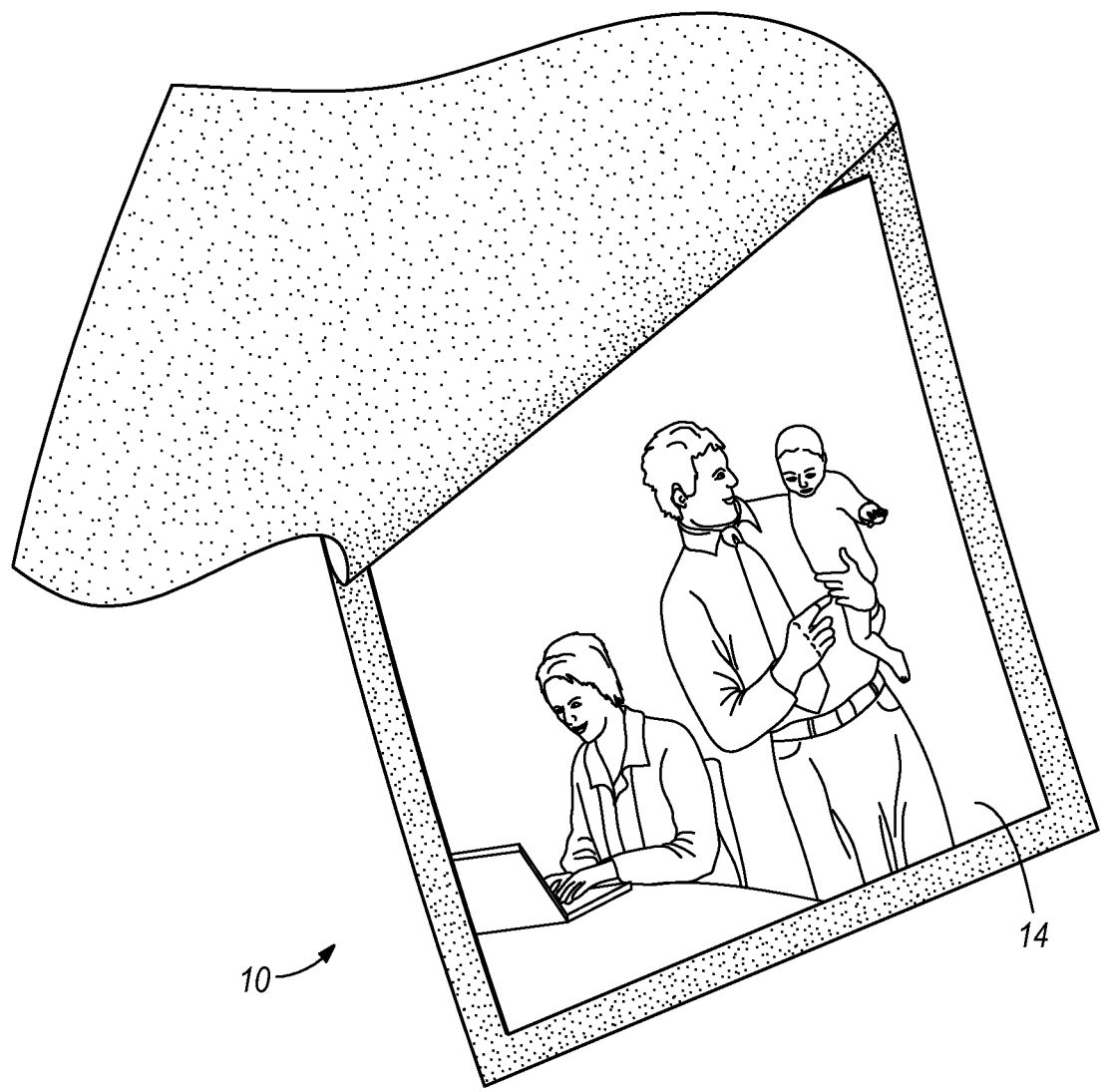
FIG. 1 is a perspective view of a conventional two-ply laminating jacket.
Figure 2:
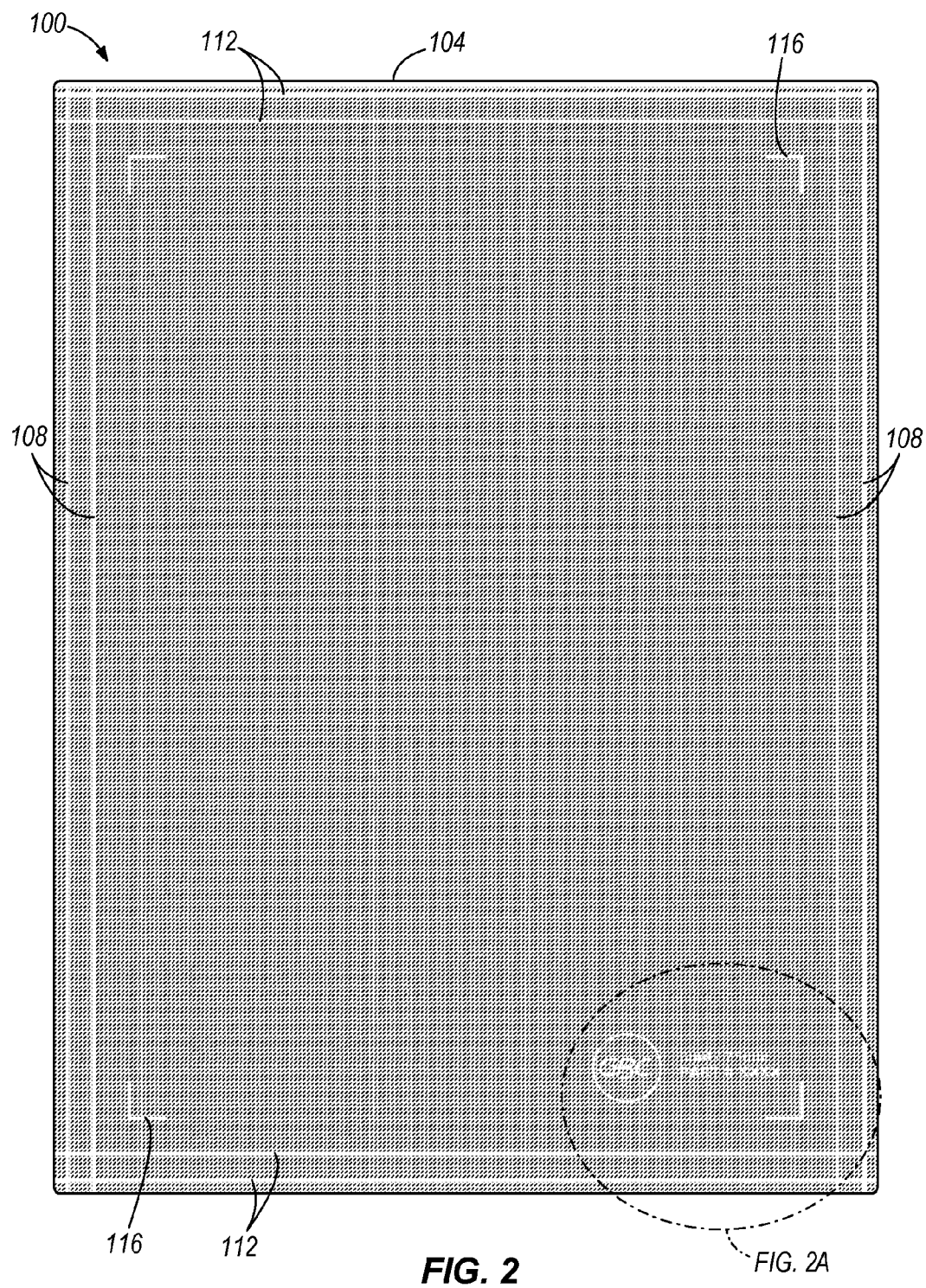
FIG. 2 is a front view of a laminating material including indicia according to one construction of the invention.

As shown in FIG. 2, the indicia of the laminating jacket 100 include alignment aides. The alignment aides may include lines or line segments running partially or fully across the laminating jacket 100. The illustrated jacket 100 is shown with a plurality of vertically-extending alignment lines 108 and a plurality of horizontally-extending alignment lines 112. The illustrated jacket 100 is also shown with corner guides 116 that include short, intersecting horizontal and vertical line segments. Although only one set of four corner guides 116 are illustrated, additional sets positioned at different locations may be provided to accommodate different standard-sized objects to be laminated. The alignment aides 108, 112, 116 help the user align a sheet-type object so that its edges are parallel with the edges of the laminating jacket 100 and may also help center the object within the jacket 100.

Furthermore, as best shown in FIG. 2A, the indicia of the laminating jacket 100 include additional information about the laminating jacket 100, such as manufacturer logo 120, indication 124 of the thickness of the laminating jacket 100, and manufacturer part or serial number 128, for example. This information provides the user with an identification of the laminating jacket 100 and properties thereof so that the user can select the appropriate laminating jacket 100 for a particular laminating job, determine how to properly configure a laminating machine for receiving and laminating the jacket 100, and identify the laminating jacket 100 for re-ordering purposes.

All of the indicia on the laminating jacket 100 are made by the configuration of the adhesive coating. For example, the indicia can be defined by varying textures in the adhesive. When the adhesive is activated (i.e., in a laminating machine), the adhesive flows and assumes a uniform texture so that all indicia disappears. This enables a multitude of information to be provided on the laminating jacket 100 to assist the user at any time before a laminating job, while preventing any indicia from appearing on the user's finished product.

Figure 3A:
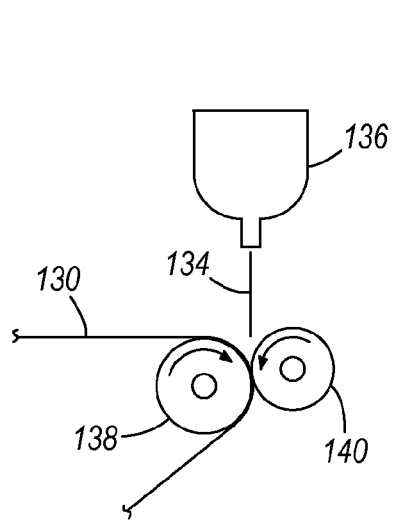
FIG. 3A is a schematic view of a manufacturing process for applying and selectively texturing adhesive applied to a laminating sheet, according to one construction of the invention.
Figure 3B:
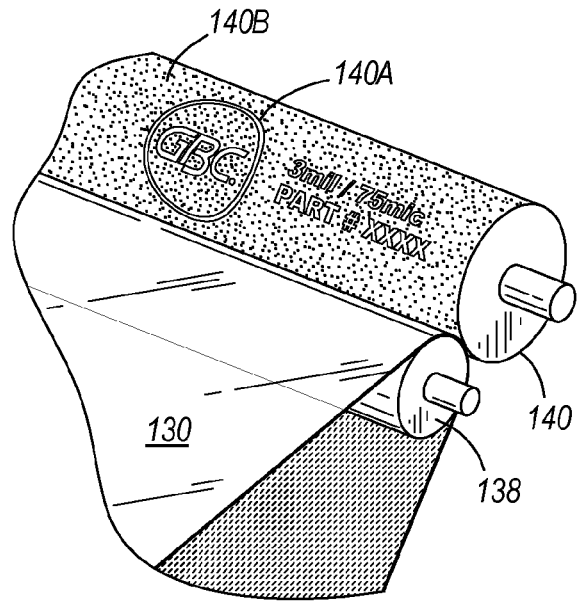
FIG. 3B is a perspective view of an adhesive texturing roller used with the manufacturing process of FIG. 3A to create laminating material with texture-formed adhesive indicia.

FIGS. 3A and 3B illustrate one manner in which indicia may be applied to the adhesive of laminating material. FIG. 3A shows a web 130 of a base material or substrate such as transparent polyethylene terephthalate (PET) for laminating material. Adhesive 134 is applied to one side of the web 130 via an extruder 136 that ejects the adhesive 134 adjacent the nip between two rollers 138, 140. In some constructions, the adhesive 134 can be ethylene-vinyl acetate (EVA) adhesive, although other adhesive types may also be used. One of the rollers 140 is a texturing roller and is shown in further detail in FIG. 3B. The texturing roller 140 imparts texture to the adhesive 134 immediately after it is applied to the web 130. In some constructions, the texturing roller 140 may be cooled so that the adhesive 134, which is applied to the web 130 in liquid form, is solidified. The texturing roller 140 includes smooth (i.e., non-textured) portions 140A configured to impart the desired indicia in the adhesive 134. The remaining portion 140B of the texturing roller 140 has a uniform nap or texture to impart a rough texture to the adhesive 134. After the web 130 passes over the texturing roller 140, the adhesive 134 includes areas with varying texture in a predetermined pattern. In this construction, the non-textured adhesive stands out visually to create the desired indicia. Thus, visible indicia is imparted to the web 130 of laminating material by imparting different textures to the adhesive 134 (i.e., rough and smooth).

Figure 4A:
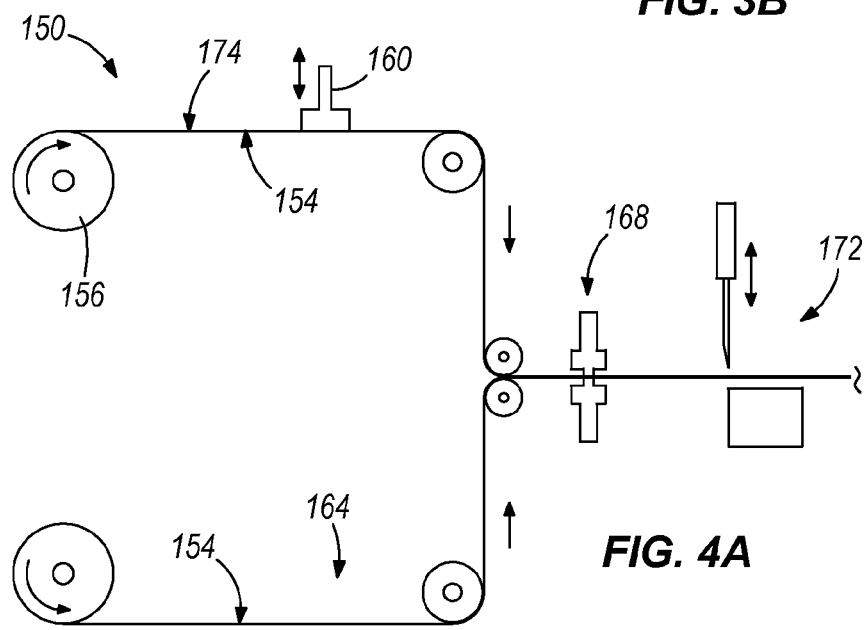
FIG. 4A is a schematic view of a manufacturing process for creating two-ply laminating jackets with texture-formed adhesive indicia, according to one construction of the invention.

FIG. 4A illustrates another manner in which indicia may be imparted to the adhesive of laminating material. Similar to FIGS. 3A and 3B, the method schematically illustrated in FIG. 4A includes creating a difference in the texture of the adhesive to impart the visible indicia. However, FIG. 4A illustrates a process of adding indicia to the adhesive of a web 150 of laminating material in which the adhesive has already been uniformly-textured. In FIG. 4A, an adhesive side 154 of the web 150 faces downward. The web 150 is fed from a roll 156 toward a heated stamp 160. Because the web 150 is combined with another web 164 for production of a two-ply laminating jacket having a length L, the production process includes downstream steps of edge-sealing (via sealer 168) and cross-cutting (via cutter 172). Since the webs 150, 164 are cross-cut at an incremental length equal to the desired jacket length L, the movement of the webs 150, 164 stops periodically. Each time the web 150 stops, the heated stamp 160 contacts a side 174 of the web 150 that is opposite the adhesive side 154. The stamp 160, which includes raised portions in the shape of the desired indicia, locally heats the adhesive through the base substrate of the web 150 so that the adhesive flows. When the adhesive flows, it is de-textured, going from a substantially rough texture to a substantially smooth texture where the raised portions of the heated stamp 160 contact the web 150 to impart a visibly distinguishable texture pattern in the form of the desired indicia. Thus, visible indicia is imparted to the laminating material by imparting different textures to the adhesive (i.e., rough and smooth).

Figure 4B:
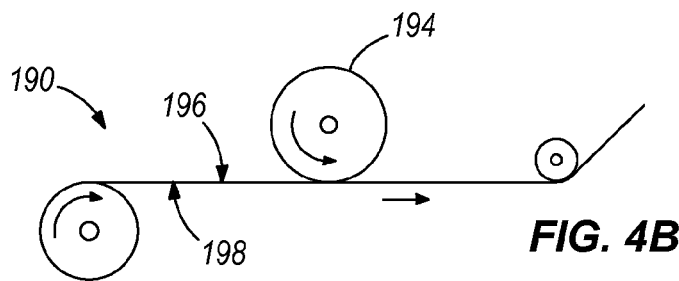
FIG. 4B is a schematic view of a manufacturing process for creating laminating material with texture-formed adhesive indicia, according to one construction of the invention.

FIG. 4B schematically illustrates a process similar to that of FIG. 4A that is suitable for a web 190 of laminating material that unwinds continuously and does not stop periodically. Instead of the stamp 160 that moves perpendicular to the direction of the web 150, the process of FIG. 4B includes imparting indicia in the adhesive by a heated roller 194 that contacts a side 196 of the web 190 opposite an adhesive side 198. Similar to the stamp 160 of FIG. 4A, the roller 194 includes raised portions that locally heat the adhesive so that the adhesive flows and loses the rough texture in a predetermined pattern to create the desired indicia. The processes illustrated in FIGS. 4A and 4B can also be reconfigured so that either the stamp 160 or the roller 194 contacts the adhesive directly to heat it and alter its texture. When reconfigured to contact the adhesive, the stamp 160 or the roller 194 (whether heated or unheated) may be used to effectively emboss the desired indicia into the adhesive. A backing plate or roller may be provided opposite the stamp 160 or roller 194 so that the stamp 160 or the roller 194 may locally compress the adhesive to alter at least one of the texture and the thickness of the adhesive.

Furthermore, non-contact heating means may be used in lieu of the stamp 160 or the roller 194 to locally heat the adhesive for creating the desired indicia. For example, the indicia can be created by precision laser etching with a laser beam, or precise application of infrared light. Non-contact heating may include selectively shielding portions of the adhesive, such as with a heat-blocking template having openings corresponding to the desired indicia.

Figure 5A:
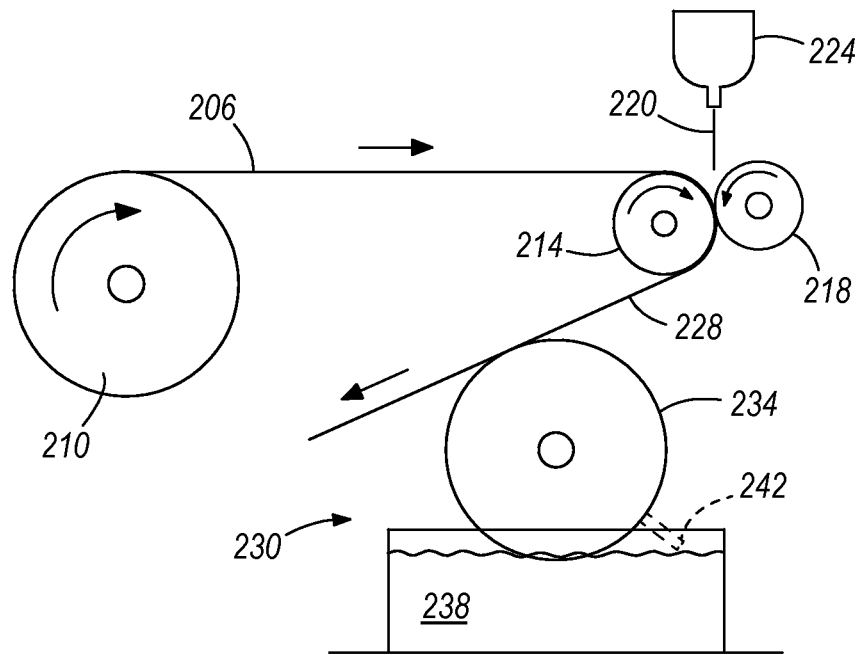
FIG. 5A is a schematic view of a manufacturing process for creating laminating material with texture-formed adhesive indicia, according to one construction of the invention.

FIG. 5A illustrates another process that can be used to create laminating material such as the laminating jacket 100 in which texture-varying of adhesive is used to create indicia. The substrate 206 for the laminating material (without adhesive) is fed from a roll 210 toward a set of rollers 214, 218. Adhesive 220 is applied to one side of the substrate 206 with an extruder 224. One of the rollers 218 is a texturing roller that imparts a uniform texture to the adhesive 220 on the substrate 206. The texturing roller 218 may be cooled to solidify the adhesive 220, which is applied in liquid form. The web is converted from the bare substrate 206 to laminating material 228 after the application of adhesive 220.

After being uniformly textured with the texturing roller 218, the web of laminating material 228 is fed to a printing station 230. As shown in FIG. 5A, the printing station 230 includes a print roller 234 for applying indicia to the laminating material 228. The print station 230 can apply indicia to the adhesive 220 on the laminating material 228 by a printing process, such as gravure printing or flexography, for example. In gravure printing, the print roller 234 is at least partially soaked in a printing fluid 238, which may be an aqueous printing fluid, so that small impressions in the roller 234 pick up the printing fluid 238. A squeegee 242 wipes the roller 234 to remove excess printing fluid before the roller 234 contacts the adhesive side of the laminating material 228. In flexography, the print roller 234 includes raised portions corresponding to the desired indicia so that only the raised portions pick up the aqueous printing fluid 238. The squeegee 242 is not necessary when the print roller 234 is a flexography roller. It should be appreciated that numerous printing methods, including roll coating, screen printing, thermal transfer, spray, etc. may also be employed to apply printing fluid to the adhesive coating.

Figure 5B:
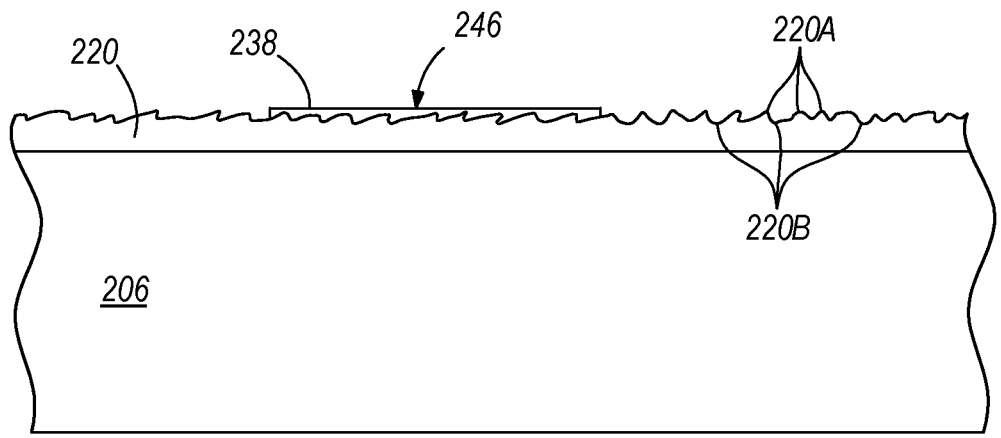
FIG. 5B is a cross-sectional view of a laminating material constructed via the process of FIG. 5A.

Regardless of the type of printing and the corresponding configuration of the print roller 234, the object of the printing station 230 is to selectively alter the visible texture of the adhesive 220 on the laminating material 228 to create visible indicia. Since the adhesive 220 is uniformly textured (e.g., to a substantially rough texture) by the texturing roller 218, the surface of the adhesive 220 includes peaks 220A and valleys 220B as shown in FIG. 5B. The print roller 234 is configured to apply the aqueous printing fluid 238 in the pattern of the desired indicia so that the printing fluid 238 at least partially fills the valleys 220B in the desired pattern to create a localized smooth surface 246, which is visibly distinguishable as indicia against the remainder of the adhesive 220 that is comparably rough-textured. Thus, visible indicia is imparted to the laminating material 228 by imparting different textures to the adhesive 220 (i.e., rough and smooth). In the construction of FIGS. 5A and 5B, imparting different textures to the adhesive 220 includes covering a portion of the rough adhesive surface with a smooth surface.

In some constructions, the printing fluid 238 is an aqueous printing fluid including EVA or other type of adhesive in a water solution. Upon drying, the water evaporates, leaving only the adhesive behind. The EVA or other type of adhesive used in the printing fluid 238 can be the same type of adhesive as the pre-applied, rough adhesive 220 on the laminating material 228. In other constructions, the printing fluid 238 does not include any adhesive and may or may not be an aqueous solution. For example, the printing fluid 238 can be solvent-based, and can be a clear varnish. Regardless of the type of printing fluid 238, the performance of the laminating material 228 is not affected or altered by the printing fluid 238 used to create the indicia.

Figure 6:
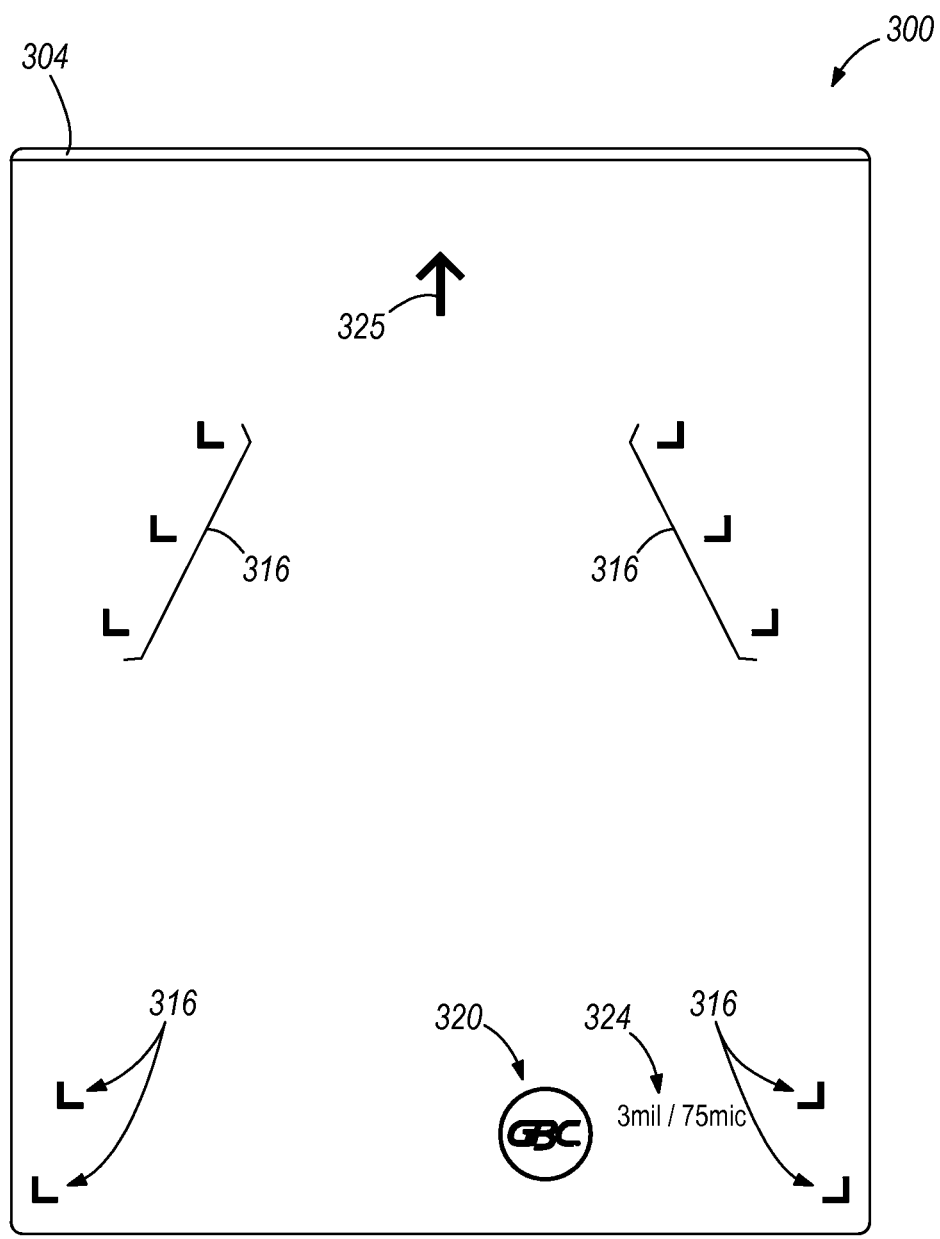
FIG. 6 is a front view of a laminating material including indicia according to one construction of the invention.

FIG. 6 illustrates a two-ply laminating jacket 300 according to another construction of the invention in which the laminating jacket 300 includes at least one adhesive coating configured to provide visible indicia. The laminating jacket 300 includes two plies or sheets of laminating material that are bonded together along a single edge 304, which is the top edge in the illustrated construction. Although shown as a top-sealed two-ply laminating jacket 300, it should be understood that many aspects of the invention described herein can be incorporated into laminating materials of virtually any form, such as a continuous roll, loose sheets, two-ply jackets of alternate construction (e.g. pouches having 2 or more sealed edges), etc. for use in laminating a sheet-type object.

As with conventional laminating materials, the two-ply laminating jacket 300 is used to laminate a sheet-type object by placing the object between the two plies of the jacket 300 and then putting the jacket 300 with the object through a laminating machine (not shown) to activate adhesive on the interior sides of the plies of the laminating jacket 300. The adhesive is activated by one or more of pressure and heat to adhere and eventually cure, thereby securing the object within the jacket 300 to form a laminated product. When activated, the adhesive flows in a liquid or semi-liquid state. The laminating process causes the adhesive to transition from a cloudy, partially opaque appearance to a substantially transparent appearance. As described in further detail below, the adhesive coating of the laminating jacket 300 is configured to provide various forms of indicia. The indicia are visible before the adhesive is activated and disappear after the adhesive is activated.

As shown in FIG. 6, the indicia of the laminating jacket 300 include alignment aides. The illustrated jacket 300 includes corner guides 316 that include short, intersecting horizontal and vertical line segments. Two pairs of corner guides 316 are illustrated adjacent the bottom of the jacket 300. The corner guides 316 adjacent the bottom of the jacket help a user center 8 inch by 10 inch sheet objects (such as photos) and 8.5 inch by 11 inch sheet objects such as standard copy, printer, or notebook paper within the laminating jacket 300. Three additional sets of corner guides 316 are provided at the upper half of the laminating jacket 300. These corner guides 316 assist a user in centering 3 inch by 5 inch objects, 4 inch by 6 inch objects, and 5 inch by 7 inch objects (all of which are standard photo print sizes). Additional corner guides can be positioned at different locations to accommodate any type of standard-sized objects to be laminated. The alignment aides may further include lines or line segments running partially or fully across the laminating jacket 300.

The indicia of the laminating jacket 300 also include a directional arrow 325. In the illustrated construction, the arrow 325 is parallel to the lengthwise direction of the laminating jacket 300 and points toward the sealed top edge 304. The arrow 325 serves as a reminder to the user of which end is the top of the laminating jacket 300. The arrow 325 may also indicate to the user which way to feed the laminating jacket 300 into a laminating machine (i.e., top edge 304 first). In addition to the arrow 325 or in place of the arrow 325, the indicia can include text with a message such as "this end up", "feed this end first", etc. As used herein, a directional arrow is any commonly identifiable symbol or indicator that is used to convey or indicate direction.

The indicia of the laminating jacket 300 include additional information about the laminating jacket 300, such as manufacturer logo 320 and indication 324 of the thickness of the laminating jacket 300. Although not shown, other indicia such as manufacturer part or serial number, for example, can also be included. This information provides the user with an identification of the laminating jacket 300 and properties thereof so that the user can select the appropriate laminating jacket 300 for a particular laminating job, determine how to properly configure a laminating machine for receiving and laminating the jacket 300, and identify the laminating jacket 300 for re-ordering purposes.

All of the indicia on the laminating jacket 300 can be made by forming varying textures in the adhesive. For example, one of the methods shown in FIGS. 3A-5B and described above may be utilized to impart the indicia. When the adhesive is activated (i.e., in a laminating machine), the adhesive flows and assumes a uniform texture so that all indicia disappears. This enables a multitude of information to be provided on the laminating jacket 300 to assist the user at any time before a laminating job, while preventing any indicia from appearing on the finished laminated product.

FIG. 6 illustrates the laminating jacket 300 schematically to illustrate a particular configuration of indicia, different from that shown in FIGS. 2 and 2A. Although the indicia in FIG. 6 is not illustrated in the drawings by stipple-shaded and non-stipple-shaded areas, this is not necessarily intended to convey that the indicia is formed in a different manner or has an outward appearance different from that shown in FIGS. 2 and 2A. In other words, the indicia that is shown as black lines in FIG. 6 may represent the areas where the adhesive has a different (e.g., smoother) texture prior to laminating.

Although several means for defining indicia on a laminating jacket by varying the texture of the adhesive coating are described in detail above, the configuration of the adhesive coating may define indicia in other ways. For example, the adhesive thickness may be varied so that differing amounts of adhesive are applied to different portions of the laminating jacket, such that the contrast between these portions creates the desired visual indicia. Some portions of the laminating jacket may even be left completely uncoated, amounting to a selective application of the adhesive coating. Furthermore, an additive with at least one visibly discernable characteristic such as color, reflectivity, etc. may be selectively applied with or on the adhesive coating to create the desired visual indicia. The additive may be sensitive to at least one of heat and pressure so that the indicia disappears during the laminating process. Thus, it should be understood that configuring the adhesive coating to provide visible indicia may occur either immediately and simultaneously with the application of the adhesive or as a secondary step or process after the initial application of adhesive to a translucent ply of a laminating jacket.

Furthermore, indicia similar to that shown in the drawings and described above may be provided on the side of a laminating material opposite the side where the adhesive coating is provided. In such constructions, the indicia may be provided by a heat-sensitive or "thermochromic" ink. Application of the heat-sensitive ink may take place by any known printing method, such as gravure printing, flexography, ink jet, laser jet, screen printing, stamping, pen applicator etc. The ink is applied with a color that is visibly distinguishable from the translucent laminating substrate. The ink-provided indicia remains visible until absorbing a predetermined amount of heat or obtaining a particular temperature, at which time the ink turns transparent. The heat-sensitive ink can be activated to change from colored to transparent by the heat applied in a laminating machine used to process the laminating material in creating a laminated product.

Various features and advantages of the invention are set forth in the following claims.

What is claimed is:

1. A laminating sheet comprising:
a translucent ply;
an adhesive coating applied to the translucent ply, the adhesive coating being activatable to flow by at least one of pressure or heat and being provided on the translucent ply in a configuration providing at least one form of indicia that is visible prior to the adhesive being activated, the at least one form of indicia including text,
wherein the at least one form of indicia is solely defined by differing textures in the adhesive coating such that the at least one form of indicia disappears when the adhesive flows, and
wherein differing textures in the adhesive coating are defined by areas of a printing fluid applied as a secondary coating over the adhesive coating.

2. The laminating sheet of claim 1, wherein the at least one form of indicia further includes an alignment aide.

3. The laminating sheet of claim 2, wherein the alignment aide includes at least one of an alignment line parallel with and spaced from at least one peripheral edge of the laminating sheet for positioning an edge of an article relative to the laminating sheet, and a corner guide for positioning a corner of an article relative to the laminating sheet.

4. The laminating sheet of claim 1, wherein the at least one form of indicia further includes a directional arrow.

5. The laminating sheet of claim 1, wherein the at least one form of indicia further includes a logo.

6. The laminating sheet of claim 1, wherein the printing fluid includes at least one of a varnish or an adhesive-water solution.

7. The laminating sheet of claim 1, wherein the printing fluid includes an adhesive that is the same as the adhesive coating.

8. The laminating sheet of claim 1, wherein the translucent ply is coupled to a second translucent ply and sealed along at least one edge to form a jacket.

9. The laminating sheet of claim 1, wherein the laminating sheet is provided in the form of a continuous roll.

10. The laminating sheet of claim 1, wherein the at least one form of indicia includes a thickness measurement of the laminating sheet.

11. The laminating sheet of claim 1, wherein the at least one form of indicia includes a part number of the laminating sheet.

12. The laminating sheet of claim 1, wherein the adhesive coating is applied to the translucent ply to cover an entire surface thereof.

13. The laminating sheet of claim 1, wherein the text identifies at least one characteristic of the laminating sheet selected from the group of: a sheet thickness, a feed orientation direction, a manufacturer, or a part number.

14. A laminating sheet comprising:
a translucent ply;
an adhesive coating applied to the translucent ply to provide continuous adhesive coverage completely covering an entire surface thereof, the adhesive coating being activatable to flow by at least one of pressure or heat and being provided on the translucent ply in a configuration providing at least one form of indicia that is visible prior to the adhesive being activated, the at least one form of indicia including text,
wherein the at least one form of indicia is solely defined by a visual contrast between areas having differing amounts of adhesive such that the at least one form of indicia disappears when the adhesive flows.

15. The laminating sheet of claim 14, wherein the at least one form of indicia further includes an alignment aide.

16. The laminating sheet of claim 15, wherein the alignment aide includes at least one of an alignment line parallel with and spaced from at least one peripheral edge of the laminating sheet for positioning an edge of an article relative to the laminating sheet, and a corner guide for positioning a corner of an article relative to the laminating sheet.

17. The laminating sheet of claim 14, wherein the at least one form of indicia further includes a directional arrow.

18. The laminating sheet of claim 14, wherein the at least one form of indicia further includes a logo.

19. The laminating sheet of claim 14, wherein the translucent ply is coupled to a second translucent ply and sealed along at least one edge to form a jacket.

20. The laminating sheet of claim 14, wherein the laminating sheet is provided in the form of a continuous roll.

21. The laminating sheet of claim 14, wherein the at least one form of indicia includes one or both of: a thickness measurement of the laminating sheet and a part number of the laminating sheet.

* * * * *